United States Patent [19]

Weaver

[11] Patent Number: 4,793,094
[45] Date of Patent: Dec. 27, 1988

[54] INSECT SWATTER INCORPORATING MEANS FOR PICKING UP DEAD INSECT

[76] Inventor: Ted T. Weaver, 301 Tolas Pl.-Space #19, Fallon, Nev. 89406

[21] Appl. No.: 634

[22] Filed: Jan. 5, 1987

[51] Int. Cl.⁴ .............................................. A01M 3/02
[52] U.S. Cl. ...................................................... 43/137
[58] Field of Search .......................................... 43/137

[56] References Cited

U.S. PATENT DOCUMENTS

| | | | |
|---|---|---|---|
| 2,601,487 | 6/1952 | Zilinsky | 43/137 |
| 2,686,327 | 8/1954 | King | 43/137 |
| 2,686,329 | 8/1954 | King | 43/137 |
| 2,806,320 | 9/1957 | Griffith | 43/137 |
| 2,902,793 | 9/1959 | Lossius | 43/137 |
| 2,911,250 | 11/1959 | Lossius | 43/137 |
| 3,673,730 | 7/1972 | Hegenberger | 43/137 |
| 4,242,828 | 1/1981 | Schurger | 43/137 |

*Primary Examiner*—Gene P. Crosby
*Attorney, Agent, or Firm*—John J. Leavitt

[57] ABSTRACT

This invention provides two structures for swatting insects and five different structures for picking up a dead or stunned insect. In one aspect of the invention, an insect swatter having a wire frame and a relatively hard head is provided, the head being specially apertured to enable picking up an insect after it has been swatted. Additionally, the handle of the swatter has been constructed to form a pincer that may be manipulated to pick up a dead insect. In another aspect, the swatter handle has a tubular grip of flexible material with a tapered slit in the periphery of the tubular handle. The slit may be positioned over a dead insect and the tubular handle in the area of the slit squeezed together so as to pick up the dead insect. In a third aspect of the invention, the swatter head itself is manufactured from a flexible and absorbent material such as polyurethane foam which, in addition to forming a swatter may be used in the same way that a tissue is used to pick up a dead insect. A paper covering on both sides of the sponge-like foam material provides surfaces for advertising copy. In a fourth aspect, the swatter has a rectilinear wire handle carrying a slidably mounted scoop device which may be manipulated to scoop up a dead insect for disposal purposes.

11 Claims, 2 Drawing Sheets

U.S. Patent  Dec. 27, 1988  Sheet 1 of 2  4,793,094
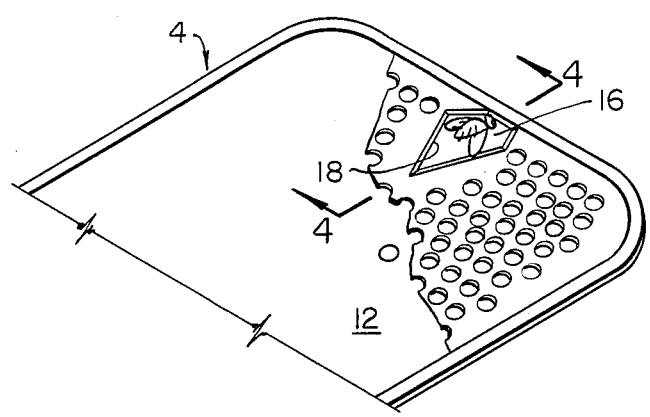
FIG. 2
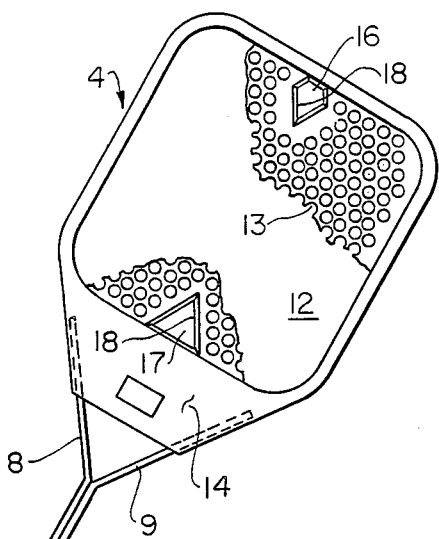
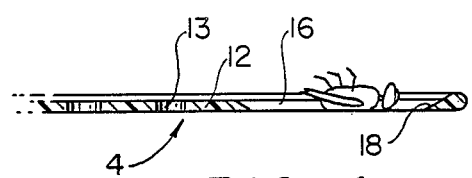
FIG. 4
FIG. 1
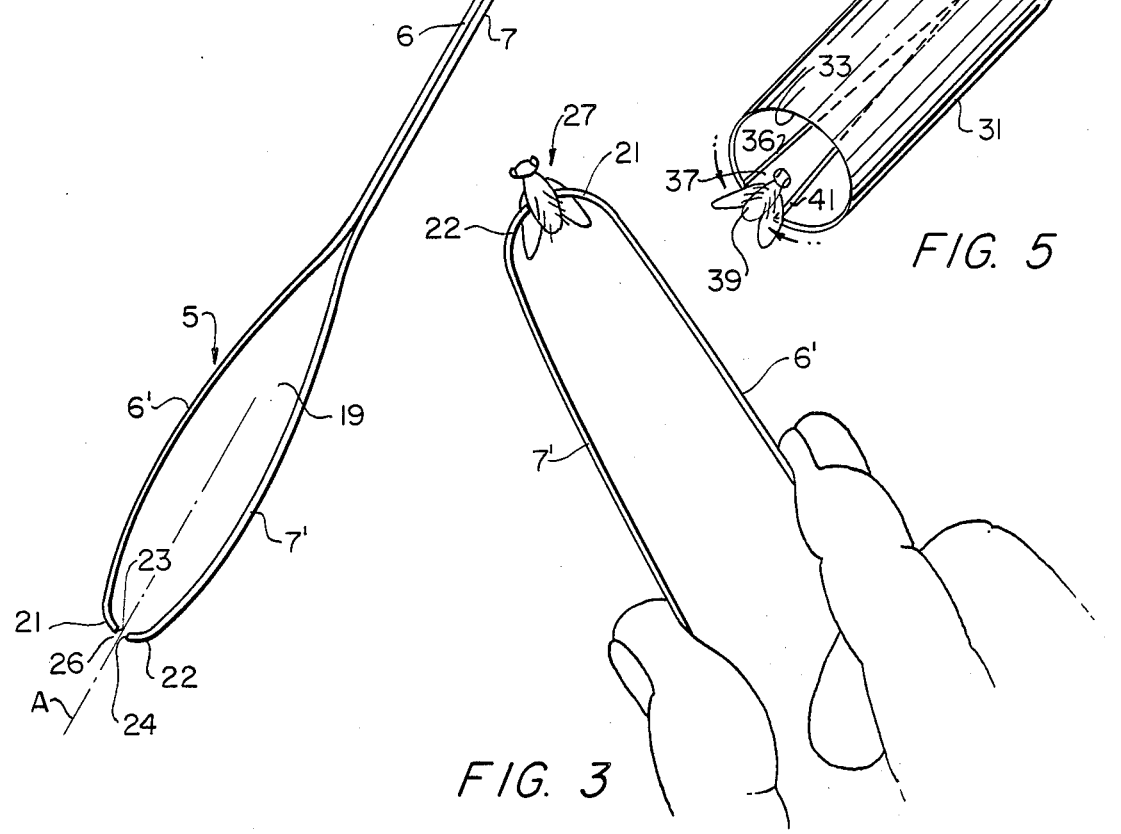
FIG. 5
FIG. 3

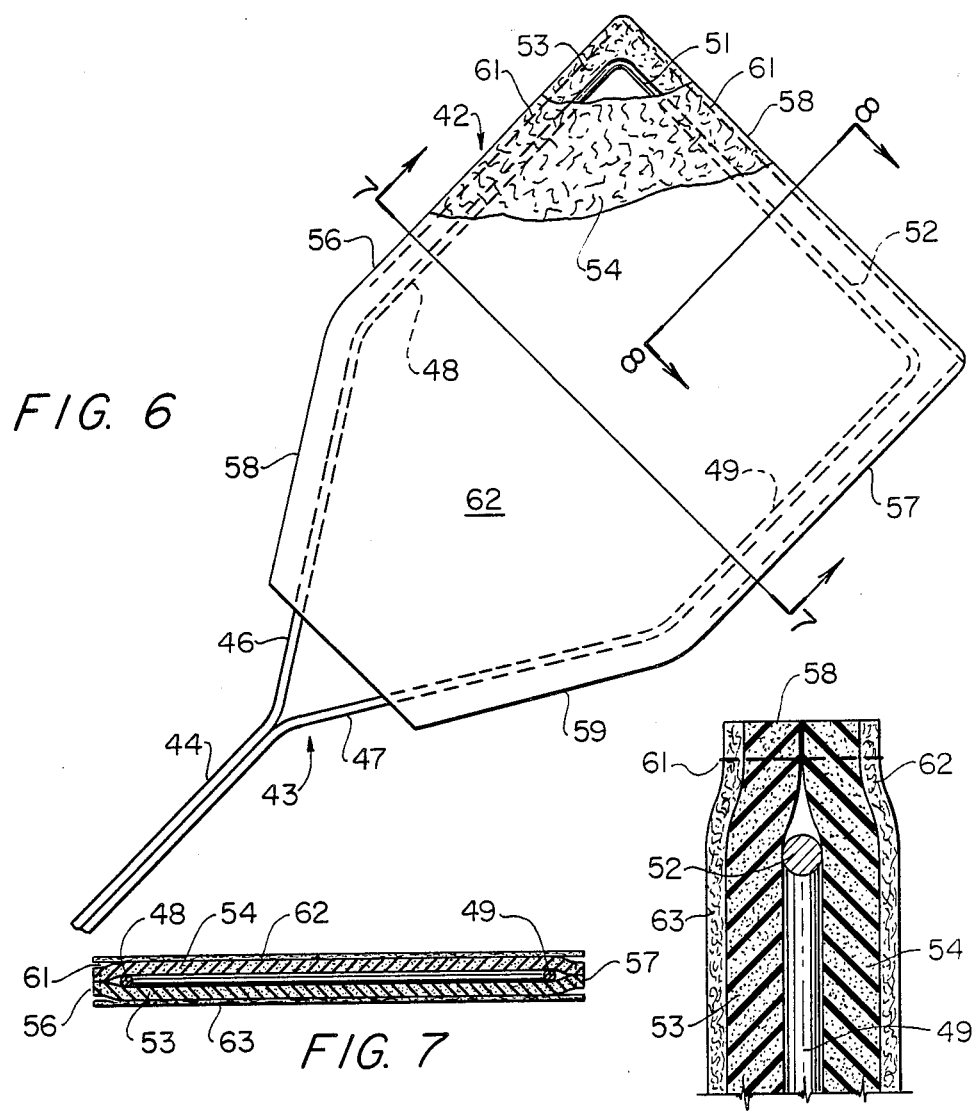
FIG. 6
FIG. 7
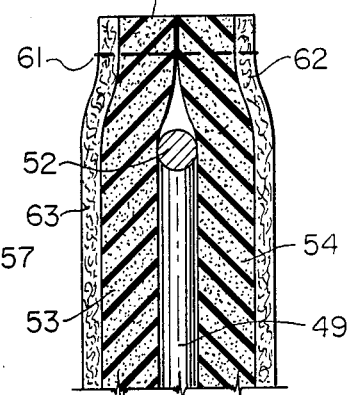
FIG. 8
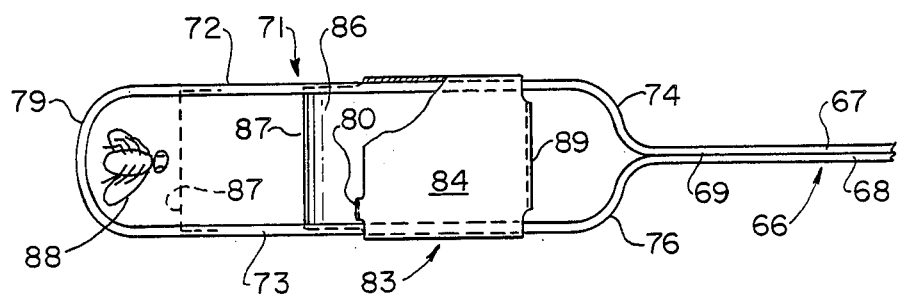
FIG. 9
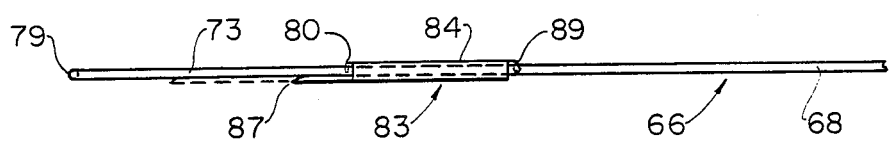
FIG. 10

൪,൭൯൩,൦൯൪

INSECT SWATTER INCORPORATING MEANS FOR PICKING UP DEAD INSECT

BACKGROUND OF THE INVENTION

1. Field of the Invention

This invention relates to insect swatters, and particularly to insect swatters equipped with means for picking up a dead insect after it has been swatted.

2. Description of the Prior Art

A preliminary patentability search has not been made in connection with this application. Applicant knows of no prior art relating to insect swatters equipped with means for picking up a dead insect. The inventor named herein is the inventor named in U.S. Pat. No. 3,499,856 describing a fly catcher with adhesive lined head.

Very little thought and inventive creativity has been given to the design of insect swatters, particularly fly swatters, especially with respect to their effectiveness in striking a fly, thus either killing or stunning it, so that it may be picked up and disposed of in the conventional manner by using a paper towel, napkin or facial tisue. One such effort is exemplified in this inventor's previous U.S. Pat. No. 3,449,856 in which the head of the fly "swatter" is transparent so that it is less likely to be seen by the fly, and is disposed over the fly gently, not in a swatting manner, so that when the fly takes off, it becomes stuck on the adhesive provided on the inside of the head. One of the problems that has become apparent with that type of fly catching device is the problem of removal of the flies stuck to the adhesive surface. Experience has shown that flies stuck to the adhesive sometimes struggle for hours to release themselves, to no avail, and finally die, still stuck to the adhesive. Then the problem becomes one of removing the dead fly from the adhesive, or leaving the dead fly stuck on the adhesive in an unsightly and unsanitary manner, or disposing of the transparent head and replacing it with a fresh one.

Accordingly, it is one of the objects of the present invention to provide an insect swatter incorporating means for picking up a dead insect using the swatter itself and enabling disposal of the dead insect in an appropriate receptacle.

I have found that more often than not when an insect is swatted with a swatter, the insect is killed or stunned, but it is not smashed to the degree that body fluids are released causing the dead insect to adhere to the surface on which it is supported. Accordingly, another object of the invention is the provision of an insect swatter incorporating swatting means for swatting an insect, and means incorporated into the swatter head by which the carcass of the insect may be picked up and carried temporarily on the flat surface of the swatter head to a convenient point of disposal.

It sometimes happens when a fly or other insect is swatted, that its carcass rests in an area where the head of the swatter itself cannot be used to pick up the insect. In such instances, particularly where the insect is resting in a corner or closely along the edge of a window or window sill, it is difficult to pick up the carcass of the fly. Accordingly, another aspect of this invention is the provision of a swatter incorporating in the handle portion thereof a pincer-like tool which may be digitally manipulated to grasp the carcass of the insect and dispose of it in an appropriate receptacle.

The use of a pincer-type device as explained above requires a certain amount of digital dexterity and a rather delicate tactile sense in the fingers to enable picking up the carcass of an insect without mangling it. Picking up an insect in this manner, i.e., without mangling it, provides for a more sanitary method of disposing of the remains. However, because of the necessity for a highly developed tactile sense in the fingertips and digital dexterity in manipulating the pincers, it is sometimes difficult for older individuals, particularly those afflicted with arthritis in the fingers, to so manipulate the pincer. Accordingly, it is another object of this invention to provide an insect swatter including a handle or gripping portion including a tubular member having an elongated tapered slit in one periphery of the flexible tubular handle member so that the slit may be positioned over the carcass of the insect and the handle merely squeezed to close the slit, thus depositing the remains of the dead insect within the tubular container formed by the handle itself. Obviously, the carcass may now be carried within the handle-container and deposited in an appropriate receptacle for disposal.

While it is not necessary in the manipulation of a swatter to strike the insect so hard as to smash it, nevertheless, such accidents do occur, and they occur sometimes because the person wielding the swatter is unable for many different reasons to gauge the strength or velocity with which the swatter should be manipulated to merely kill or stun the insect but not smash it. Accordingly, another object of the invention is the provision of a swatter incorporating a head formed from relatively soft and flexible synthetic resinous material in the nature of sponge rubber or polyurethane foam in sheet form and preferably of the open celled-type that is pervious to water. It has been found that a swatter having this type head may be easily manipulated to strike an insect, but because of its soft and flexible nature, it is more difficult to hit the insect with such force as to smash it.

Still another object of the invention is the provision of a swatter incorporating a scoop manipulable to scoop up the carcass of the insect.

SUMMARY OF THE INVENTION

This invention involves five embodiments, one of the embodiments being an insect swatter embodying an elongated wire frame having a handle at one end and a swatting head at the opposite end. In one aspect of this embodiment of the invention, the swatting head is fabricated from a relatively hard plastic and is provided with at least one, but preferably two enlarged apertures configured in such a way that an aperture may be disposed around a dead insect, such as a fly, and the head manipulated in such a way as to pick the insect up and deposit it on the flat surface of the swatter head. In another aspect of this embodiment, the wire handle of the swatter is designed in the form of a pincer so that the handle may be manipulated to pick up the insect and deposit it in an appropriate receptacle for disposal. In a third embodiment of the invention, the elongated handle of the swatter is provided with a tubular gripper portion one end of which is closed and the other open, and an elongated tapered slit is provided in the periphery of the tubular gripper portion. The slit may thus be positioned over a dead insect and the tubular handle squeezed to close the slit, thus depositing the dead insect within the tubular gripper portion for appropriate disposal. In a fourth aspect of the invention, the handle of the swatter at one end is provided with a swatter head formed from two sheets of flexible and water pervious synthetic resinous material such as open-celled polyurethane foam, the two sheets being stitched around the peripheral edges to retain the head on the handle. This embodiment of the invention may include sheets of appropriate paper or other sheet material attached to the polyurethane foam either by stitching or by releasable adhesive, the paper sheets being appropriate for printed indicia such as printed advertising material. In a fifth aspect of the invention, the handle portion of the swatter assembly is configured to slidably receive a scoop device which may be manipulated along the gripper portion of the swatter for scooping up a dead insect and facilitate disposing of it in an appropriate and sanitary manner.

BRIEF DESCRIPTION OF THE DRAWINGS

FIG. 1 is a perspective view illustrating one embodiment of the insect swatter structure of the invention incorporating a head having means for picking up an insect that has been swatted, and incorporating a handle having a gripper portion also equipped with means for picking up the carcass of an insect.

FIG. 2 is an enlarged fragmentary perspective view of the head portion of the insect swatter illustrated in FIG. 1.

FIG. 3 is a perspective view illustrating the use of the handle gripper portion of the swatter of FIG. 1 as a pincer to pick up a fly carcass.

FIG. 4 is a horizontal cross-sectional view taken in the plane indicated by the line 4—4 of FIG. 2 and illustrating the manner in which a fly carcass is picked up with the head of the insect swatter.

FIG. 5 is a fragmentary perspective view of the handle or gripper portion of an insect swatter illustrating a gripper portion formed as an elongated tubular member having a peripheral slit to facilitate picking up the carcass of a fly or other insect.

FIG. 6 is a fragmentary perspective view of an insect swatter having a swatting head formed from juxtaposed layers of soft and flexibly resilient synthetic resinous material in the nature of sponge rubber or polyurethane foam.

FIG. 7 is a horizontal cross-sectional view taken in the plane indicated by the line 7—7 of FIG. 6.

FIG. 8 is a horizontal cross-sectional view taken in the plane indicated by the line 8—8 in FIG. 6.

FIG. 9 is a fragmentary elevational view illustrating the handle portion of an insect swatter equipped with a scoop device for scooping up a dead insect.

FIG. 10 is an edge elevational view of FIG. 9.

DESCRIPTION OF THE PREFERRED EMBODIMENTS

Referring to FIG. 1, there is there shown an insect swatter designated generally by the numeral 2 and including an intermediate handle extension portion designated generally by the numeral 3, having attached at one end a swatter head designated generally by the numeral 4, and at the opposite end having a handle or gripper potion designated generally by the numeral 5. In the embodiment illustrated in FIG. 1, the intermediate handle extension portion 3 is formed from wire elements 6 and 7 that are juxtaposed and preferably welded so as to maintain their juxtaposed relationship through the entire intermediate section. The wire members may of course be twisted at selected locations to accomplish the same result.

At one end of the intermediate handle extension portion, the two wires 6 and 7 diverge in extensions 8 and 9, respectively, to form a generally triangular support for the head 4 which, in this embodiment, constitutes a thin, relatively hard plastic sheet of body 12 having a multiplicity of small apertures 13 which function to permit air to pass through the body 12 when the swatter is swung, while retaining enough surface of the body to swat an insect. The head 4 is attached to the extensions 8 and 9 by having the extensions 8 and 9 embedded in a generally triangular portion 14 of the head as illustrated.

To enable the swatter head to be used as a pick up device for a dead insect, the head is provided with a first aperture 16 formed in the body 12 adjacent the extreme end edge of the head remote from the handle 5. A second aperture 17 is provided at the opposite end of the body 2 next adjacent the triangular portion 14. Each of the apertures 16 and 17 is provided with tapered edges 18 which function as inclined ramps so that when the head is positioned so that one or the other of the apertures 16 or 17 surrounds the dead insect, say a fly that has been swatted, a quick movement of the head, such as a sharp jerk, will cause the fly to be scooped onto the adjacent flat surface of the body 12 of the swatter head. This relationship of a fly, and the aperture 16 in the body 12 is illustrated in FIGS. 2 and 4.

At the opposite end of the swatter from the head 4, the handle or gripper portion 5 is formed by wires 6 and 7 diverging as extensions 6' and 7' over a considerable length to embrace a generally oval space 19 separating the two wires 6' and 7' in this area, with the two wires 6' and 7' terminating in normally spaced end portions 21 and 22 that are curved inwardly toward each other to provide opposing and normally spaced flat end surfaces 23 and 24 as shown. The surfaces 23 and 24 are spaced apart on opposite sides of a median plane A so that a gap 26 exists between the flat opposed surfaces 23 and 24. Thus, as illustrated in FIG. 3, the gripper portion 5 of the swatter assembly may be digitally manipulated to place the flat surfaces 23 and 24 of the gripper portion 5 on opposite sides of a fly, designated generally by the numeral 27, so that only slight pressure on the wire members 6' and 7' effects a pincers action, thus enabling the fly to be picked up in a sanitary manner and disposed of in an adequate container. Obviously, while I have illustrated the fly as being grasped by its body, any other portion of the fly may be grasped in order to pick the fly up and dispose of it properly.

FIG. 5 illustrates another embodiment of a pincer's type handle structure for picking up and disposing of a dead insect in a sanitary manner. As illustrated, the intermediate handle extension portion 28 of an insect swatter terminates in a handle or gripper portion 29, which comprises an elongated thin-walled tubular member 31, preferably fabricated from thin plastic material and closed at its end 32 where it joins extension 28 and open at its end 33. The tubular thin wall 31 of the handle portion is provided with a longitudinally extending slit 34, the edges 36 of which converge inwardly from its widest point 37 to a point 38 where the edges 36 join. As illustrated in FIG. 5, the slit 34 is oriented with respect to a fly or other insect 39 so that the insect lies disposed between the edges 36 of the slit. Then, all that is required is that radially inwardly compressing pressure be applied on the tubular handle portion 29, thus closing the slit 34 and causing the fly to be picked up between the two edges 36 and deposited into the interior of the hollow handle portion 29. From the hollow handle portion, the fly may be conveniently and sanitarily deposited in an appropriate receptacle. As with the apertures 16 and 17 in the head 4, the longitudinally extending edges 36 of the slit 34 may be beveled as at 41 to render the edges 36 relatively sharp so as to facilitate the edges 36 functioning as an inclined ramp and passing underneath the insect during the pick up procedure.

Referring to the embodiment of the invention illustrated in FIG. 6, as explained above, it is sometimes difficult for the person wielding the swatter to wield it with only sufficient force to kill or stun an insect rather than with so much force as to smash or crush the insect. Obviously, an insect that has been smashed or crushed is much more unsanitary, unsightly, and difficult to pick up. In many instances the crushed remains of an insect must be firmly grasped or wiped up with a flexible absorbent material such as a paper towel, napkin, or a facial tissue, so that not only the body of the dead insect is picked up, but also any body fluids that have been released from the insect are also picked up during the pick up operation. For this purpose, as illustrated in FIG. 6, the swatting head designated generally by the numeral 42, is mounted on a frame designated generally by the numeral 43, here shown to be diverging wires as before and including an intermediate handle extension portion 44 at the head end of which the individual wires 46 and 47 diverge and merge smoothly and integrally with spaced and parallel wire frame extensions 48 and 49, each of which at its end opposite the intermediate handle extension portion 44 turns inwardly to form axially aligned right angle extensions 51 and 52.

Superimposed over opposite sides of this frame, which could of course be fabricated from any appropriate material, metal or non-metallic, are sheets 53 and 54 of a synthetic resinous material such as polyurethane foam, preferably the open-cell variety, or sponge rubber type material in thin sheet form having lateral edges 56 and 57 and end edges 58 next adjacent the frame members 51 and 52. At the opposite end of the sheets 53 and 54, the sheets are tapered to coincide with the divergence angle of the wire frame members 46 and 47, thus providing tapered edges 58 and 59 as shown. To secure the two oppositely positioned sheets of synthetic resinous material 53 and 54 to the frame sandwiched therebetween, a row of stitching 61 is provided around the outer periphery outboard of the frame members, thus transforming the two sheets of thin and flexible polyurethane foam material into a pocket within which is trapped the frame head.

It will of course be apparent that while I have disclosed and illustrated a frame to hold the thin and flexible polyurethane or sponge-like sheets 53 and 54 extended, the frame head may be modified in any manner desired so long as the sheets 53 and 54 are held extended. Additionally, while I have indicated the use of two juxtaposed sheets to form a pocket, obviously a single sheet of sponge-like material could also be utilized mounted in the same manner as illustrated in FIG. 1, or in an equivalent manner.

As illustrated in FIGS. 6, 7 and 8, a final optional step in the manufacture of this embodiment of the swatter head may be to attach one or a pair of paper cover sheets 62 and 63 to cover the outside surfaces of the underlying polyurethane foam or sponge-like sheets 53 and 54. These protective sheets 62 and 63 may be paper or other appropriate material, and are attached only at the extreme end of the head next adjacent the frame members 51 and 52. They may be attached by the same stitching 61 that retains the two sheets of foam material 53 and 54 secured together in this region. The two protective sheets 62 and 63 keep the sheets 53 and 54 clean during packaging, shipping and storage. Additionally, the protective sheets 62 and 63 are available for whatever type of advertising indicia may be appropriate under the circumstances. When the purchaser of the fly swatter wishes to use the fly swatter, all that is necessary is that the sheets 62 and 63 be tugged or stripped off the stitching or adhesive, thus leaving the insect swatter ready for use.

In the embodiment of the invention illustrated in FIGS. 9 and 10, the elongated wire handle is designated generally by the numeral 66, and comprises wire rods 67 and 68 juxtaposed as at 69 for a greater part of its length. The wire rods 67 and 68 diverge to form a handle or gripping portion designated generally by the numeral 71 formed from the now spaced add parallel wire rod portions 72 and 73 which constitutes integral extensions of wire rods 67 and 68 through divergent transition portions 74 and 76, respectively. The extreme end of the handle 71 is formed by a curved wire rod portion 79 that integrally joins the wire rod 72 and 73 as shown. The handle thus provides a convenient gripping portion for manipulating the swatter portion of the fly swatter.

The handle 71 performs another function, namely, as a support for a scoop designated generally by the numeral 83. When a fly or other insect is swatted, it should be picked up and disposed of sanitarily to prevent the contamination of which flies and insects are capable, dead or alive. The scoop 83 almost ideally enables performance of this pick up function. The scoop 83 is conveniently fabricated from a thin metallic sheet formed to provide a top plate 84 spanning the two wire rods 72 and 73, and a bottom plate 76 that projects beyond one asociated edge of the top plate to provide a lip or ramp 87 adapted to slip under the dead fly 88 when the scoop is slidably displaced along the wire rods 72 and 73. To form a receptacle for retaining the fly after it is scooped up, the top plate 84 is provided with a depending flange 89, which also functions as a stop to prevent inadvertent disengagement of the scoop 83 from the handle 71. If desired, a tab 80 may also be provided on the scoop end of the top plate to limit movement of the scoop in the opposite direction which the tab abutts the curved portion 79 of the handle. The displaced position of the scoop in preparation for picking up the dead fly 88 is illustrated in broken lines.

Having picked up, or more accurately speaking, scooped up the fly or insect, it may now be deposited in the receptacle formed by scoop 83, and carried to a convenient point of disposal.

The invention possesses other objects and features of advantage, some of which with the foregoing, will be apparent from the foregoing specification and the drawings. It is to be understood however that the invention is not limited to the embodiments disclosed and illustrated, since it may be embodied in various forms within the scope of the appended claims.

Having thus described the invention, what is believed to be new and novel and sought to be protected by letters patent of the United States is as follow:

I claim:

1. A swatter for swatting insects such as flies and spiders, comprising:
 (a) an elongated handle having a gripping portion adapted to be gripped in the hand of a user to effect a swatting movement of the swatter to swat an insect;

(b) a swatting head attached to said handle at the end thereof remote from said gripping portion whereby to impact with an insect as a result of a swatting movement, said swatting head being a substantially flat, thin quadrilateral body; and (c) means formed on said swatting head for picking up said insect after it has been swatted, comprising at least one aperture in said swatting head sufficiently large to admit the passage of the swatted insect from one side of the head to the other, whereby when said aperture is positioned about the insect and the swatting head is moved relative to the insect in a plane common to both the insect and the swatting head, the swatted insect will be lifted and deposited on the swatting head for appropriate disposal therefrom.

2. The combination according to claim 1, in which at least two enlarged apertures are provided at opposite ends of the swatting head, each aperture defined by edges that slope from one side of said swatting head to the other to form a ramp.

3. A swatter for swatting insects such as flies and spiders, comprising:
(a) an elongated handle having a gripping portion adapted to be gripped in the hand of a user to effect a swatting movement of the swatter to swat an insect;
(b) a swatting head attached to said handle at the end thereof remote from said gripping portion whereby to impact with an insect as a result of a swatting movement, said swatting head being a substantially flat, thin quadrilateral body; and
(c) means formed on said gripping portion for picking up the insect after it has been swatted, in which said gripping portion comprises an elongated tubular member open at one end, and said means includes an elongated slit formed in said tubular member and defined by elongated and normally spaced edges whereby said slit may be positioned about the insect and the gripping portion squeezed to bring said elongated edges together under the insect to thus close the slit and confine the insect in the tubular gripping portion.

4. A swatter for swatting insects such as flies and spiders, comprising:
(a) an elongated handle having a gripping portion adapted to be gripped in the hand of a user to effect a swatting movement of the swatter to swat an insect;
(b) a swatting head attached to said handle at the end thereof remote from said gripping portion whereby to impact with an insect as a result of a swatting movement, said swatting head being a substantially flat, thin quadrilateral body; and
(c) means for picking up an insect comprising a scoop, including interconnected top and bottom plates slidably disposed on said gripping portion and defining a receptacle by which said insect may be picked up.

5. A swatter for swatting insects such as flies and spiders, comprising:
(a) an elongated handle having a gripping portion adapted to be gripped in the hand of a user to effect a swatting movement of the swatter to swat an insect, said handle being formed from metal wire; and (b) a swatting head attached to said handle at the end thereof remote from said gripping portion whereby to impact with an insect as a result of a swatting movement, said swatting head being a substantially flat, thin quadrilateral body formed from at least one sheet of flexible open-cell synthetic resinous foam material through which the insect may be picked up by human fingers for disposal subsequent to being swatted.

6. The combination according to claim 1, in which a flat sheet of material on which indicia may be printed is detachably secured to said swatting head by stitching to at least one marginal edge portion of said foam material, said flat sheet having contoured edges of the same configuration as said foam material.

7. The combination according to claim 1, further comprising additional means on at least one end of said swatter for picking up and disposing of an insect after it has been swatted.

8. A swatter for swatting insects such as flies and spiders, comprising:
(a) an elongated handle having a gripping portion adapted to be gripped in the hand of a user to effect a swatting movement of the swatter to swat an insect, said handle being formed from metal wire;
(b) a swatting head attached to said handle at the end thereof remote from said gripping portion whereby to impact with an insect as a result of a swatting movement, said swatting head being a substantially flat, thin quadrilateral body formed from a pair of juxtaposed sheets of flexible open-cell synthetic resinous foam material stitched along at least three marginal edge portions to form a pocket to receive said handle; and
(c) means on at least one end of said swatter for picking up and disposing of an insect after it has been swatted.

9. A swatter for swatting insects such as flies and spiders, comprising:
(a) an elongated handle having a gripping portion adapted to be gripped in the hand of a user to effect a swatting movement of the swatter to swat an insect;
(b) a swatting head attached to said handle at the end thereof remote from said gripping portion whereby to impact with a insect as a result of a swatting movement, said swatting head being a substantially flat, thin quadrilateral body; and
(c) means for picking up an insect after it has been swatted comprising a scoop slidably mounted on said gripping portion.

10. A swatter for swatting insects such as flies and spiders, comprising:
(a) an elongated handle having a gripping portion adapted to be gripped in the hand of a user to effect a swatting movement of the swatter to swat an insect, said gripping portion including a pair of spaced rod-like members;
(b) a swatting head attached to said handle at the end thereof remote from said gripping portion whereby to impact with an insect as a result of a swatting movement, said swatting head being a substantially flat, thin quadrilateral body; and
(c) means for picking up an insect after it has been swatted comprising a scoop slidably mounted on said rod-like members of said gripping portion, said scoop including a receptacle closed at one end and open at the scoop end, whereby an insect may be scooped into said receptacle by effecting relative movement between said gripping portion and said scoop.

11. A swatter for swatting insects such as flies and spiders, comprising:
(a) an elongated handle having a gripping portion adapted to be gripped in the hand of a user to effect a swatting movement of the swatter to swat an insect, said handle being formed from metal wire;
(b) a swatting head attached to said handle at the end thereof remote from said gripping portion whereby to impact with an insect as a result of a swatting movement, said swatting head being a substantially flat, thin quadrilateral body formed from a pair of juxtaposed sheets of flexible synthetic resinous foam material stitched along at least three marginal edge portions to form a pocket to receive said handle;
(c) means on at least one end of said swatter for picking up and disposing of an insect after it has been swatted; and
(d) a flat sheet of material on which indicia may be printed detachably secured to each of said juxtaposed sheets of synthetic foam material by stitching to at least one marginal edge portion of said foam material, each said flat sheet having contoured edges of the same configuration as said foam material.

\* \* \* \* \*